(12) United States Patent
Nishikoori

(10) Patent No.: US 12,370,610 B2
(45) Date of Patent: Jul. 29, 2025

(54) CUTTING INSERT, CUTTING TOOL, AND METHOD FOR MANUFACTURING MACHINED PRODUCT

(71) Applicant: KYOCERA CORPORATION, Kyoto (JP)

(72) Inventor: Hironori Nishikoori, Yasu (JP)

(73) Assignee: KYOCERA CORPORATION, Kyoto (JP)

( * ) Notice: Subject to any disclaimer, the term of this patent is extended or adjusted under 35 U.S.C. 154(b) by 308 days.

(21) Appl. No.: 18/000,290

(22) PCT Filed: May 28, 2021

(86) PCT No.: PCT/JP2021/020418
§ 371 (c)(1),
(2) Date: Nov. 30, 2022

(87) PCT Pub. No.: WO2021/246321
PCT Pub. Date: Dec. 9, 2021

(65) Prior Publication Data
US 2023/0294183 A1    Sep. 21, 2023

(30) Foreign Application Priority Data
Jun. 1, 2020   (JP) ................................ 2020-095460

(51) Int. Cl.
*B23B 5/20*   (2006.01)
*B23C 5/20*   (2006.01)

(52) U.S. Cl.
CPC ...... *B23C 5/202* (2013.01); *B23C 2200/0438* (2013.01); *B23C 2200/08* (2013.01); *B23C 2200/24* (2013.01)

(58) Field of Classification Search
CPC .......... B23C 2210/082; B23C 2210/08; B23C 2200/12; B23C 2200/121;
(Continued)

(56) References Cited

U.S. PATENT DOCUMENTS 8,979,440 B2 * 3/2015 Ishi ......................... B23C 5/205
                                                                  407/42
2002/0098049 A1 * 7/2002 Satran ................... B23C 5/2213
                                                                  407/113
(Continued)

FOREIGN PATENT DOCUMENTS

| JP | 2010523352 A | 7/2010 |
| JP | 2012500732 A | 1/2012 |
| WO | 2013002341 A1 | 1/2013 |

*Primary Examiner* — Nicole N Ramos
(74) *Attorney, Agent, or Firm* — HAUPTMAN HAM, LLP

(57) ABSTRACT

A cutting insert has an upper surface, a lower surface and a lateral surface. The upper surface has a first upper side, and a second upper side. The lower surface has a first lower side and a second lower side. The lateral surface has a first lateral surface, a second lateral surface, and a third lateral surface. The first lateral surface has a first concave part having a first constraining surface having a flat shape. The second lateral surface has a second concave part having a second constraining surface having a flat shape. The third lateral surface has a convex part. The first concave part and the second concave part are separated from each other by the convex part.

11 Claims, 21 Drawing Sheets

(58) Field of Classification Search
CPC ........ B23C 2200/123; B23C 2200/125; B23C 2200/126; B23C 2200/128; B23C 2200/0438; B23C 2200/28; B23C 2200/291; B23C 5/2213; B23C 5/202
See application file for complete search history.

(56) References Cited

U.S. PATENT DOCUMENTS

| | | |
|---|---|---|
| 2007/0003384 A1* | 1/2007 | Smilovici ............. B23C 5/2213 407/113 |
| 2010/0054873 A1 | 3/2010 | Men et al. |
| 2010/0080662 A1 | 4/2010 | Satran et al. |
| 2010/0111619 A1 | 5/2010 | Ballas et al. |
| 2010/0215446 A1* | 8/2010 | Wandeback ............ B23C 5/202 407/51 |
| 2014/0178135 A1 | 6/2014 | Yamamoto |
| 2014/0334890 A1* | 11/2014 | Takahashi ............... B23C 5/205 407/40 |
| 2016/0158854 A1* | 6/2016 | Ishi ......................... B23C 5/202 409/131 |
| 2017/0291231 A1* | 10/2017 | Mao ........................ B23C 5/202 |

* cited by examiner

CUTTING INSERT, CUTTING TOOL, AND METHOD FOR MANUFACTURING MACHINED PRODUCT

CROSS-REFERENCE TO RELATED APPLICATIONS

This application is a national stage entry according to 35 U.S.C. 371 of PCT Application No. PCT/JP2021/020418 filed on May 28, 2021, which claims priority to Japanese Patent Application No. 2020-095460, filed on Jun. 1, 2020, which is entirely incorporated herein by reference.

TECHNICAL FIELD

The present disclosure generally relates to a cutting insert which is used in a cutting process of a workpiece, a cutting tool and a method for manufacturing machined product. More specifically, the present disclosure relates to a cutting tool for use in a milling process.

BACKGROUND

For example, a cutting insert used in a cutting tool discussed in Japanese Unexamined Patent Publication No. 2010-523352 (Patent Document 1) has been known as a cutting insert for use in a cutting process of a workpiece, such as metal. The cutting insert discussed in Patent Document 1 has major cutting edges and minor cutting edges respectively located on two end surfaces (an upper surface and a lower surface). A peripheral lateral surface is located between the upper surface and the lower surface that are these two end surfaces. The peripheral lateral surface has a flat surface that connects to the major cutting edge on the upper surface and the minor cutting edge on the lower surface, and another flat surface that connects to the minor cutting edge on the upper surface and the major cutting edge on the lower surface. These flat surfaces are inclined relative to a central axis, thereby improving durability of the major cutting edges.

The above two flat surfaces are usable as an abutting surface configured to abut against a holder in the cutting tool discussed in Cited Document 1. However, because these two flat surfaces connect to the major cutting edges and the minor cutting edges in Cited Document 1, these two flat surfaces are likely to be damaged by contact with a workpiece. This may deteriorate constraining stability of the cutting insert.

SUMMARY

A cutting insert in a non-limiting aspect of the present disclosure has an upper surface, a lower surface, a lateral surface, an upper cutting edge and a lower cutting edge. The upper surface having a polygonal shape has a first upper corner, a first upper side extended from the first upper corner, and a second upper side extended from the first upper corner. The lower surface having a polygonal shape has a first lower corner located below the first upper corner, a first lower side located below the second upper side and extended from the first lower corner, and a second lower side located below the first upper side and extended from the first lower corner. The lateral surface is located between the upper surface and the lower surface. The upper cutting edge is located on an intersection of the upper surface and the lateral surface. The lower cutting edge is located on an intersection of the lower surface and the lateral surface. The lateral surface has a first lateral surface connecting to the first upper side and the second lower side, a second lateral surface connecting to the second upper side and the first lower side, and a third lateral surface located between the first lateral surface and the second lateral surface. An imaginary straight line passing through a center of the upper surface and a center of the lower surface is a central axis. The first lateral surface has a first concave part having a first constraining surface having a flat shape. The second lateral surface has a second concave part having a second constraining surface having a flat shape. The third lateral surface has a convex part having a convex shape in a cross section along the central axis. The first concave part and the second concave part are located away from each other with the convex part interposed therebetween.

EMBODIMENTS

<Cutting Inserts>

Figure 1:
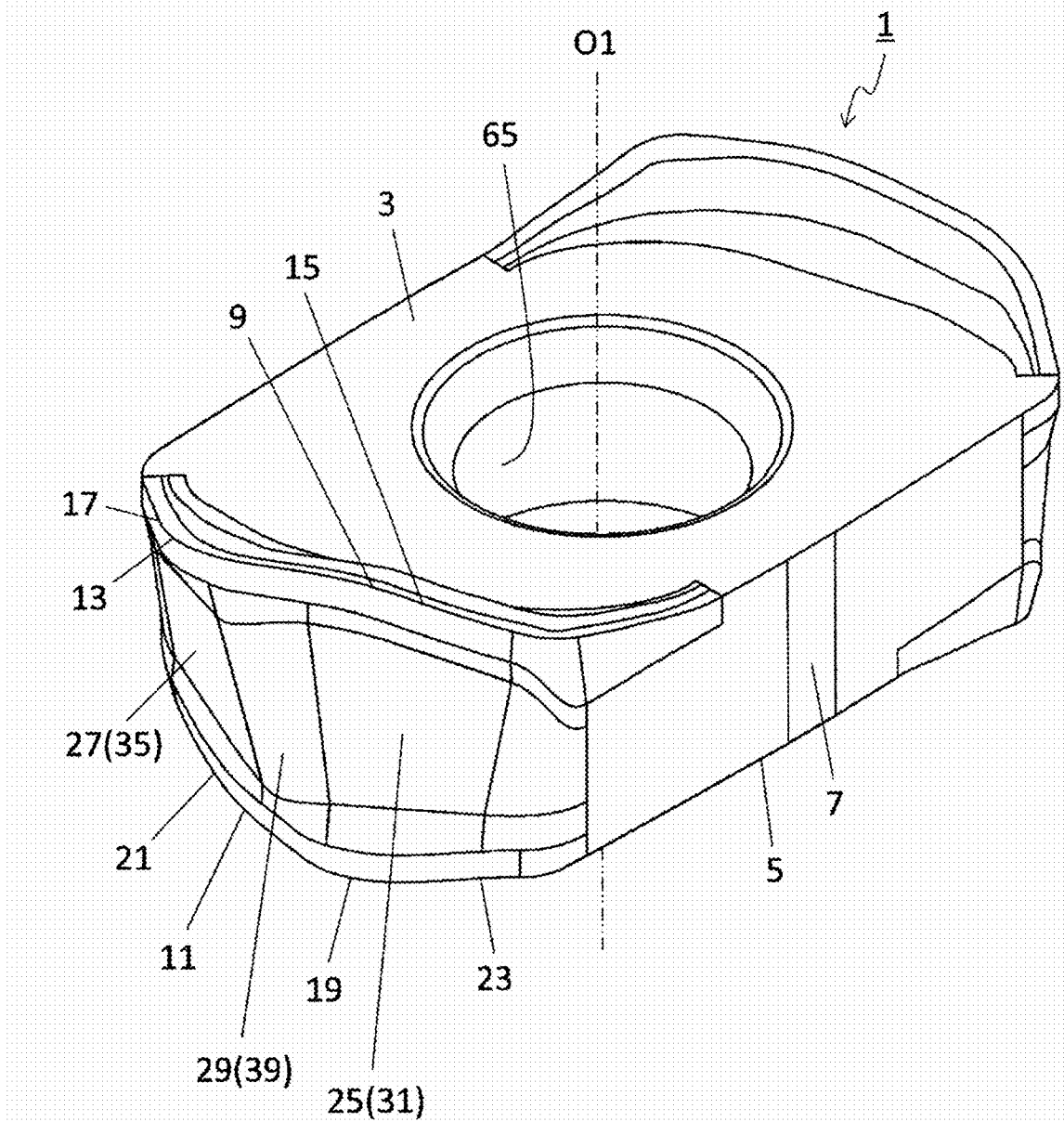
FIG. 1 is a perspective view illustrating a cutting insert in a non-limiting embodiment of the present disclosure.

The cutting insert 1 (hereinafter also referred to as "insert 1") in a non-limiting embodiment of the present disclosure is described in detail below with reference to the drawings. For the convenience of description, the drawings referred to in the following illustrate, in simplified form, only main members necessary for describing the embodiment. The insert 1 may therefore have any arbitrary structural member not illustrated in the drawings referred to. Dimensions of the members in each of the drawings faithfully represent neither dimensions of actual structural members nor dimensional ratios of these members. To facilitate visual understanding, diagonal lines are drawn in a particular region of the insert 1 in FIG. 7.

The insert 1 may have an upper surface 3, a lower surface 5, a lateral surface 7, an upper cutting edge 9 and a lower cutting edge 11 as in a non-limiting embodiment illustrated in FIGS. 1 to 16. As used herein, the terms "the upper surface 3" and "the lower surface 5" are used for the sake of convenience and do not respectively indicate upper and lower directions. For example, the upper surface 3 need not be directed upward when using the insert 1. These points are also true for other parts names including the term "upper" or "lower."

The upper surface 3 may have a polygonal shape. The lower surface 5 may be located on a side opposite to the upper surface 3. Similarly to the upper surface 3, the lower surface 5 may have a polygonal shape. The insert 1 may have a polygonal plate shape.

Examples of the polygonal shape may have triangle, square, pentagon, hexagon and octagon. However, the polygonal shape need not be a strict polygonal shape. For example, a plurality of sides in the upper surface 3 need not be individually a strict straight line, but may be slightly curved in a front view (top view) of the upper surface 3. A plurality of corners in the upper surface 3, which are respectively located between adjacent sides, need not be a strict corner. In other words, the plurality of corners on the upper surface 3 may not be a strict corner. These corners may have a convex curvilinear shape, or a combined shape made up of a straight line and a curved line as viewed from above. These points are also true for the lower surface 5.

An imaginary straight line passing through a center of the upper surface 3 and a center of the lower surface 5 may be a central axis O1 of the insert 1. If the upper surface 3 has a polygonal shape, corners located at opposite corners on the upper surface 3 may be individually connected by a straight line, and a point of intersection of these straight lines may be regarded as the center of the upper surface 3. A starting point of a diagonal may be a portion where extension lines of the individual sides constituting the polygonal shape intersect with each other. A centroid position of the upper surface 3 as viewed from above may be the center of the upper surface 3. The center of the lower surface 5 may be defined similarly to the center of the upper surface 3.

The upper surface 3 may have 180° rotational symmetry around the central axis O1 as viewed from above. The lower surface 5 may have 180° rotational symmetry around the central axis O1 if the lower surface 5 is viewed from the front (from below).

The plurality of corners on the upper surface 3 may have a first upper corner 13. The plurality of sides on the upper surface 3 may have a first upper side 15 and a second upper side 17. That is, the upper surface 3 may have the first upper corner 13, the first upper side 15 and the second upper side 17.

The first upper corner 13 may have an obtuse angle. In this case, the first upper corner 13 is less prone to fracture. Of the plurality of corners on the upper surface 3, the first upper corner 13 may be located farthest away from the central axis O1 as viewed from above.

Each of the first upper side 15 and the second upper side 17 may be extended from the first upper corner 13. A length of the first upper side 15 may be identical to or different from a length of the second upper side 17. For example, the length of the first upper side 15 may be larger than the length of the second upper side 17 as in the non-limiting embodiment illustrated in FIG. 1.

The plurality of corners on the lower surface 5 may have a first lower corner 19. The plurality of sides on the lower surface 5 may have a first lower side 21 and a second lower side 23. That is, the lower surface 5 may have the first lower corner 19, the first lower side 21 and the second lower side 23.

The first lower corner 19 may be located below the first upper corner 13. In cases where the first upper corner 13 and the first lower corner 19 are individually identified by a single point, a determination may be made that the first lower corner 19 is located below the first upper corner 13 if the first upper corner 13 and the first lower corner 19 satisfy the following conditions. That is, the determination may be made that the first lower corner 19 is located below the first upper corner 13 if an angle formed by an imaginary straight line connecting the first upper corner 13 and the first lower corner 19, and the central axis O1 is 10° or less as in a front view (side view) of the lateral surface 7.

As in the cases where the corner has the convex curvilinear shape or the combined shape made up of the straight line and the curved line, in cases where the first upper corner 13 and the first lower corner 19 are identified by a line instead of a point, the determination may be made that the first lower corner 19 is located below the first upper corner 13 if the first upper corner 13 and the first lower corner 19 satisfy the following conditions.

That is, the determination may be made that the first lower corner 19 is located below the first upper corner 13 if at least a part of the first upper corner 13 is overlapped with at least a part of the first lower corner 19 in a direction along the central axis O1 as viewed from the side. In other words, the determination may be made that the first lower corner 19 is located below the first upper corner 13 in cases where the first upper corner 13 is extended toward the lower surface 5 in the direction along the central axis O1 as viewed from the side, and it intersects or overlaps with the first lower corner 19.

The first lower corner 19 may have an obtuse angle. In this case, the first lower corner 19 is less prone to fracture. Of the plurality of corners on the lower surface 5, the first lower corner 19 may be located farthest away from the central axis O1 as viewed from below.

Each of the first lower side 21 and the second lower side 23 may be extended from the first lower corner 19. A length of the first lower side 21 may be identical to or different from a length of the second lower side 23. For example, the length of the first lower side 21 may be larger than the length of the second lower side 23 as in the non-limiting embodiment illustrated in FIG. 1.

The first lower side 21 may be located below the second upper side 17. The second lower side 23 may be located below the first upper side 15. The above phrase that the lower sides (the first lower side 21 and the second lower side 23) are "located below" the upper sides (the second upper side 17 and the first upper side 15) may mean being intersecting with a target portion on the lower side if the upper side is extended toward the lower surface 5 in a direction along the central axis O1 as viewed from the side, as in, for example, a non-limiting embodiment illustrated in FIG. 6. Alternatively, the term "located below" may mean that the target portion appears on the lower side in a cross section that is parallel to the central axis O1 and intersects with the upper side, as in a non-limiting embodiment illustrated in FIGS. 8 to 16.

The insert 1 is not limited to a specific size. For example, a maximum width if the upper surface 3 is viewed from above may be set to approximately 6-25 mm. A height from the upper surface 3 to the lower surface 5 may be set to approximately 1-10 mm. The height from the upper surface 3 to the lower surface 5 may mean a maximum value of a distance between the upper surface 3 and the lower surface 5 in a direction parallel to the central axis O1. The height from the upper surface 3 to the lower surface 5 may be rephrased as a width of the lateral surface 7 in the direction along the central axis O1.

The lateral surface 7 may be located between the upper surface 3 and the lower surface 5. The lateral surface 7 may connect to the upper surface 3 and the lower surface 5 as in a non-limiting embodiment illustrated in FIG. 5.

The upper cutting edge 9 may be located on an intersection of the upper surface 3 and the lateral surface 7. The upper cutting edge 9 is usable for cutting out a workpiece if a machined product is manufactured using the insert 1.

The upper cutting edge 9 may be located on the whole or a part of the intersection. The upper cutting edge 9 may have a straight line shape or a curvilinear shape as viewed from above or as viewed from the side. Alternatively, the upper cutting edge 9 may have a combined shape made up of a straight line and a curved line as viewed from above or as viewed from the side.

If the insert 1 has the upper cutting edge 9, one of the upper surface 3 and the lateral surface 7 may have a rake surface region, and the other of the upper surface 3 and the lateral surface 7 may have a flank surface region. The upper surface 3 may have the rake surface region, and the lateral surface 7 may have the flank surface region as in the non-limiting embodiment illustrated in FIG. 1.

The lower cutting edge 11 may be located on an intersection of the lower surface 5 and the lateral surface 7. Similarly to the upper cutting edge 9, the lower cutting edge 11 is usable for cutting out a workpiece if a machined product is manufactured using the insert 1.

The lower cutting edge 11 may be located on the whole or a part of the intersection. The lower cutting edge 11 may have a straight line shape or a curvilinear shape as viewed from below or as viewed from the side. Alternatively, the lower cutting edge 11 may have a combined shape made up of a straight line and a curved line as viewed from below or as viewed from the side. If the insert 1 has the upper cutting edge 9 and the lower cutting edge 11, the insert 1 is servable as a double-sided insert.

Figure 6:
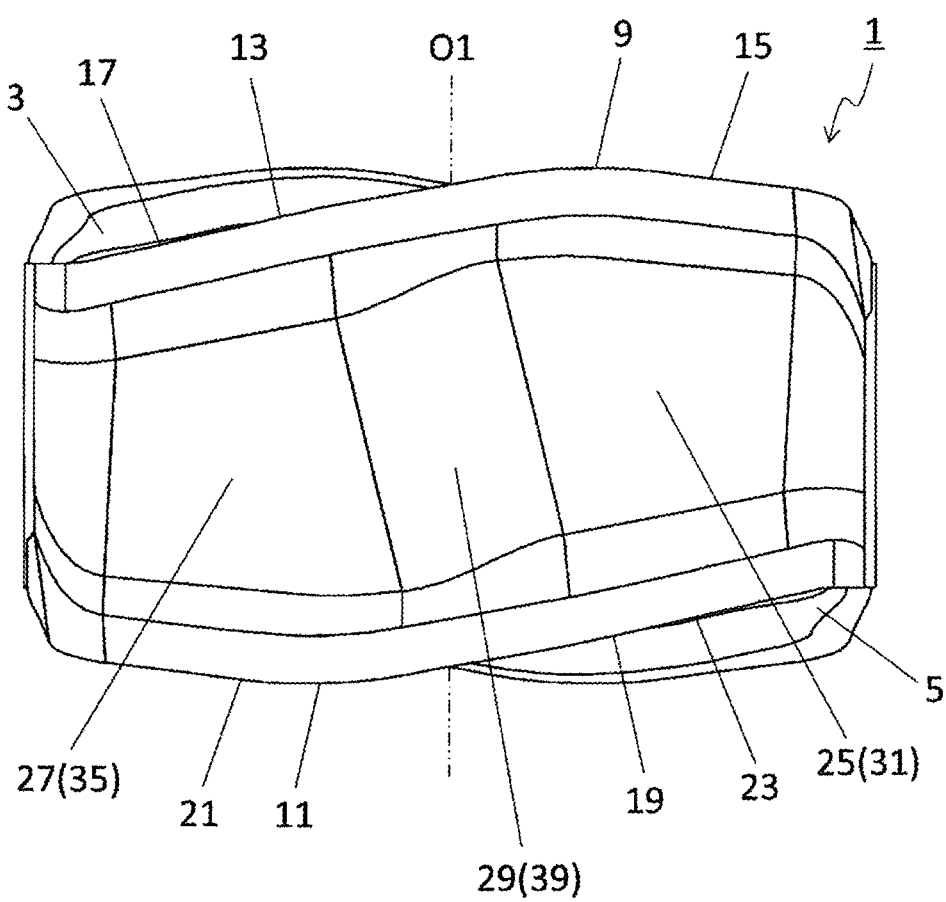
FIG. 6 is a side view of the cutting insert illustrated in FIG. 2 as viewed from an A2 direction.

As in the non-limiting embodiment illustrated in FIGS. 1 and 6, the lateral surface 7 may have a first lateral surface 25, a second lateral surface 27 and a third lateral surface 29. The first lateral surface 25 may connect to the first upper side 15 and the second lower side 23. The second lateral surface 27 may connect to the second upper side 17 and the first lower side 21. The third lateral surface 29 may be located between the first lateral surface 25 and the second lateral surface 27.

Figure 7:
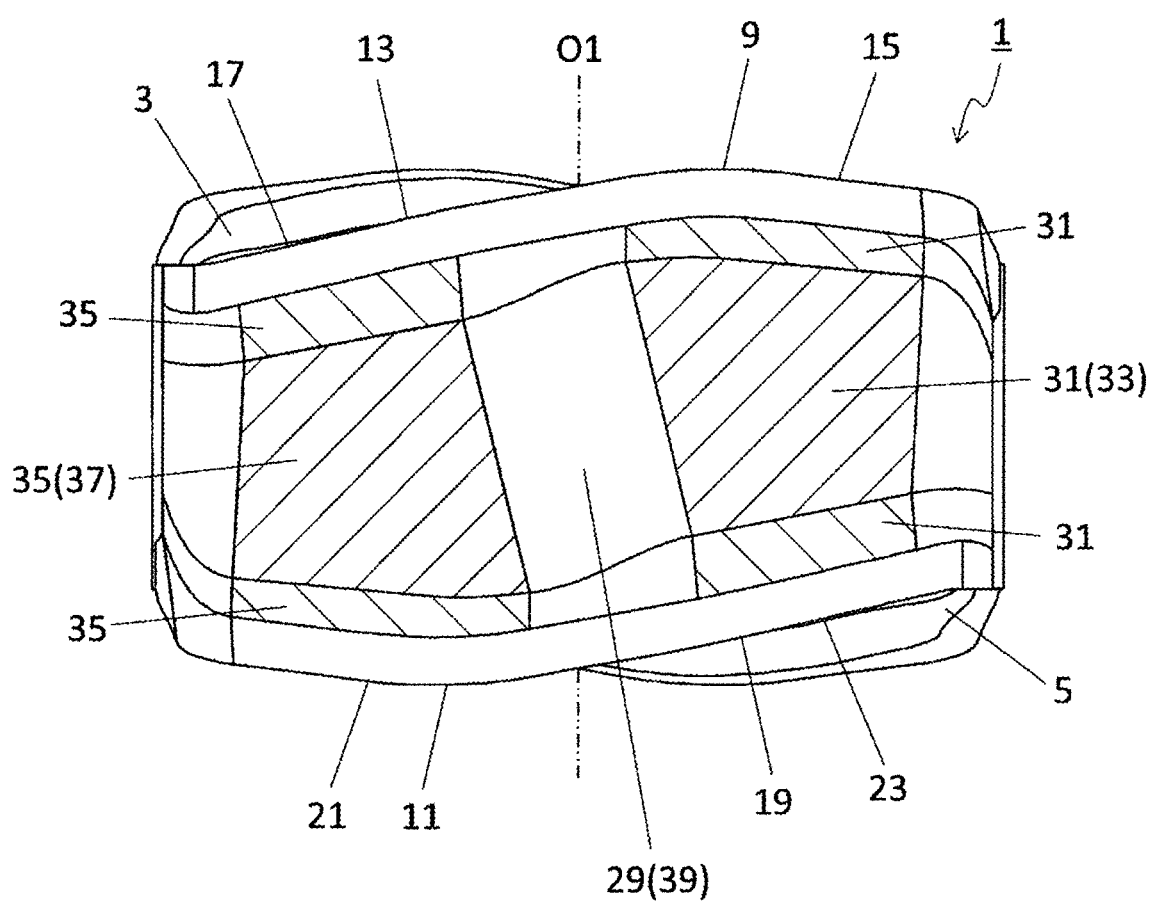
FIG. 7 is a side view of the cutting insert illustrated in FIG. 2 as viewed from an A2 direction.
Figure 8:
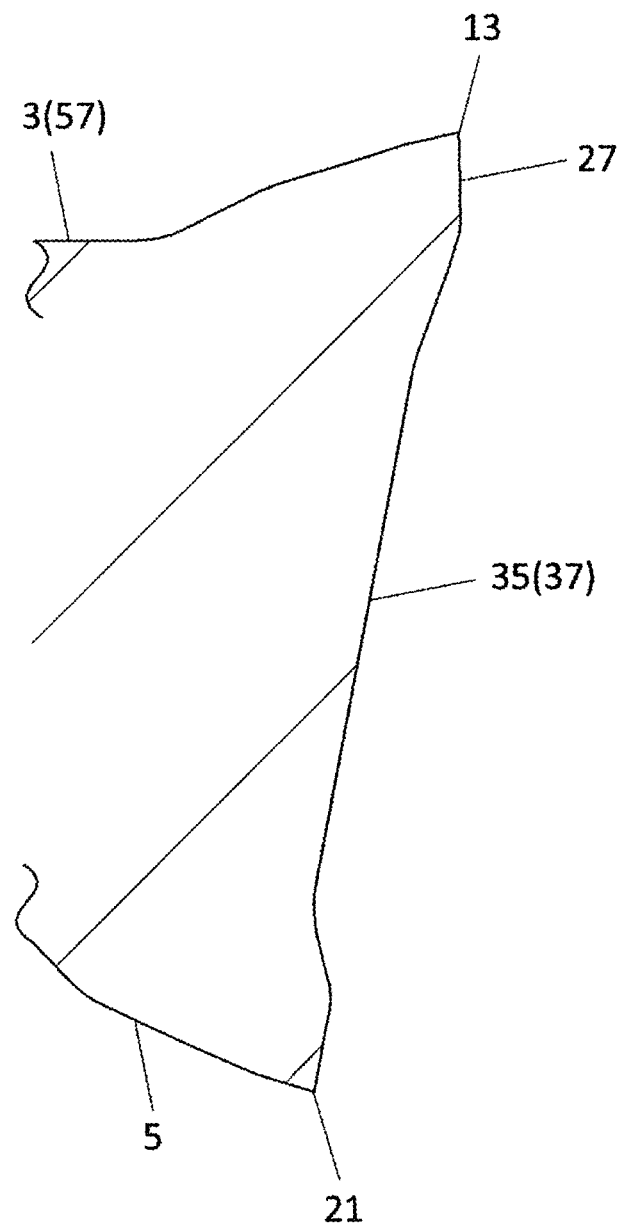
FIG. 8 is a sectional view taken along line VIII-VIII illustrated in FIG. 3.
Figure 9:
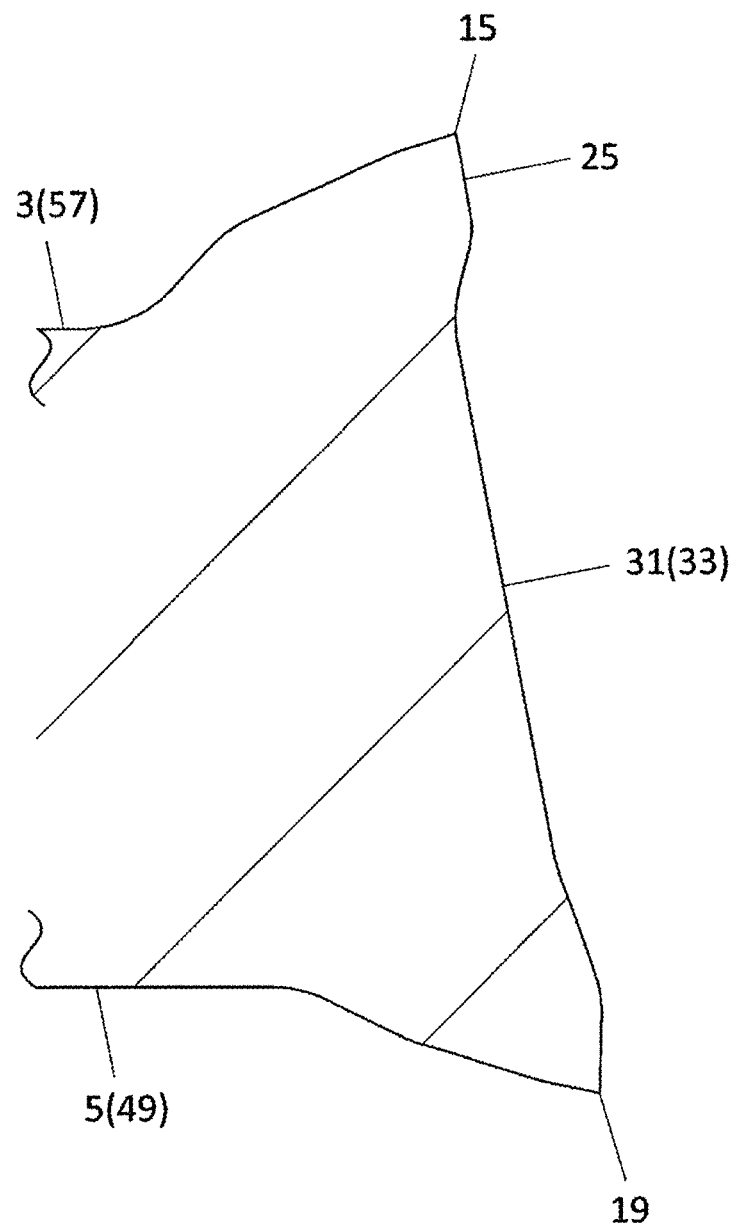
FIG. 9 is a sectional view taken along line IX-IX illustrated in FIG. 3.
Figure 10:
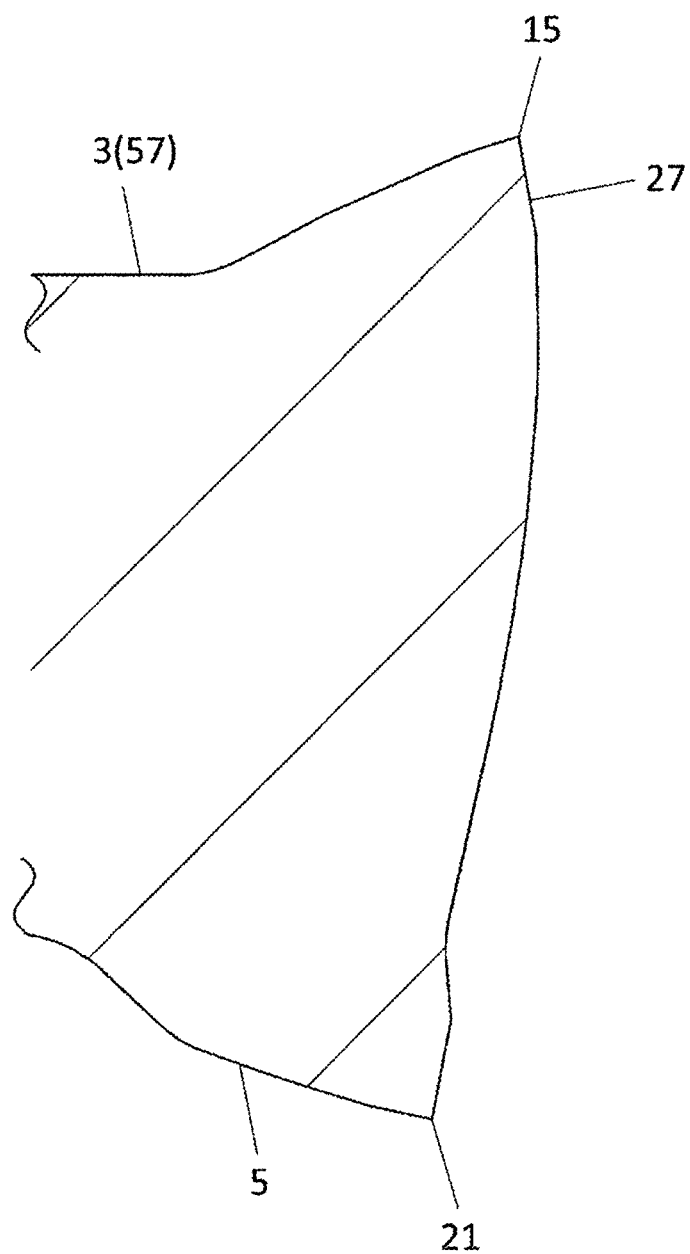
FIG. 10 is a sectional view taken along line X-X illustrated in FIG. 3.

As in a non-limiting embodiment illustrated in FIG. 7, the first lateral surface 25 may have a first concave part 31. The first concave part 31 may have a first constraining surface 33 having a flat shape. The second lateral surface 27 may have a second concave part 35. The second concave part 35 may have a second constraining surface 37 having a flat shape.

The above "constraining surface" may mean being usable as a surface constrained by a holder when the insert 1 is attached to the holder. That is, the first constraining surface 33 and the second constraining surface 37 are not necessarily become the surface constrained by the holder during use of the upper cutting edge 9.

The first constraining surface 33 and the second constraining surface 37 need not be strictly flat. The first constraining surface 33 and the second constraining surface 37 may be an approximately flat surface, and specifically may be slightly curved or may have small irregularities to such a degree that cannot be seen if the insert 1 is viewed as a whole. For example, the first constraining surface 33 and the second constraining surface 37 may have small irregularities of approximately several tens of μm. These points are also true for other flat surfaces.

If the first lateral surface 25 has the first concave part 31 having the first constraining surface 33, the first constraining surface 33 is located inside the first concave part 31, and therefore the first constraining surface 33 is less likely to come into contact with a workpiece in a cutting process. Similarly, if the second lateral surface 27 has the second concave part 35 having the second constraining surface 37, the second constraining surface 37 is located inside the second concave part 35, and therefore the second constraining surface 37 is less likely to come into contact with the workpiece in the cutting process. This helps to avoid damage and deterioration of the first constraining surface 33 and the second constraining surface 37, thereby enhancing the constraining stability of the insert 1.

The first concave part 31 may be located away from the first upper side 15, and may be located away from the second lower side 23. The second concave part 35 may be located away from the second upper side 17, and may be located away from the first lower side 21.

The third lateral surface 29 may have a convex part 39. The convex part 39 may have a convex shape in a cross section along the central axis O1 as in a non-limiting embodiment illustrated in FIG. 16. The first concave part 31 and the second concave part 35 may be located away from each other with the convex part 39 interposed therebetween.

Durability of the cutting edge may be lowered if the lateral surface 7 has a large concave part, for example, such a configuration that the first concave part 31 connects to the second concave part 35. The convex part 39 is servable as a beam. Consequently, if the first concave part 31 and the second concave part 35 may be located away from each other with the convex part 39 interposed therebetween, the durability of the insert 1 is less likely to be lowered under the presence of the convex part 39.

Figure 11:
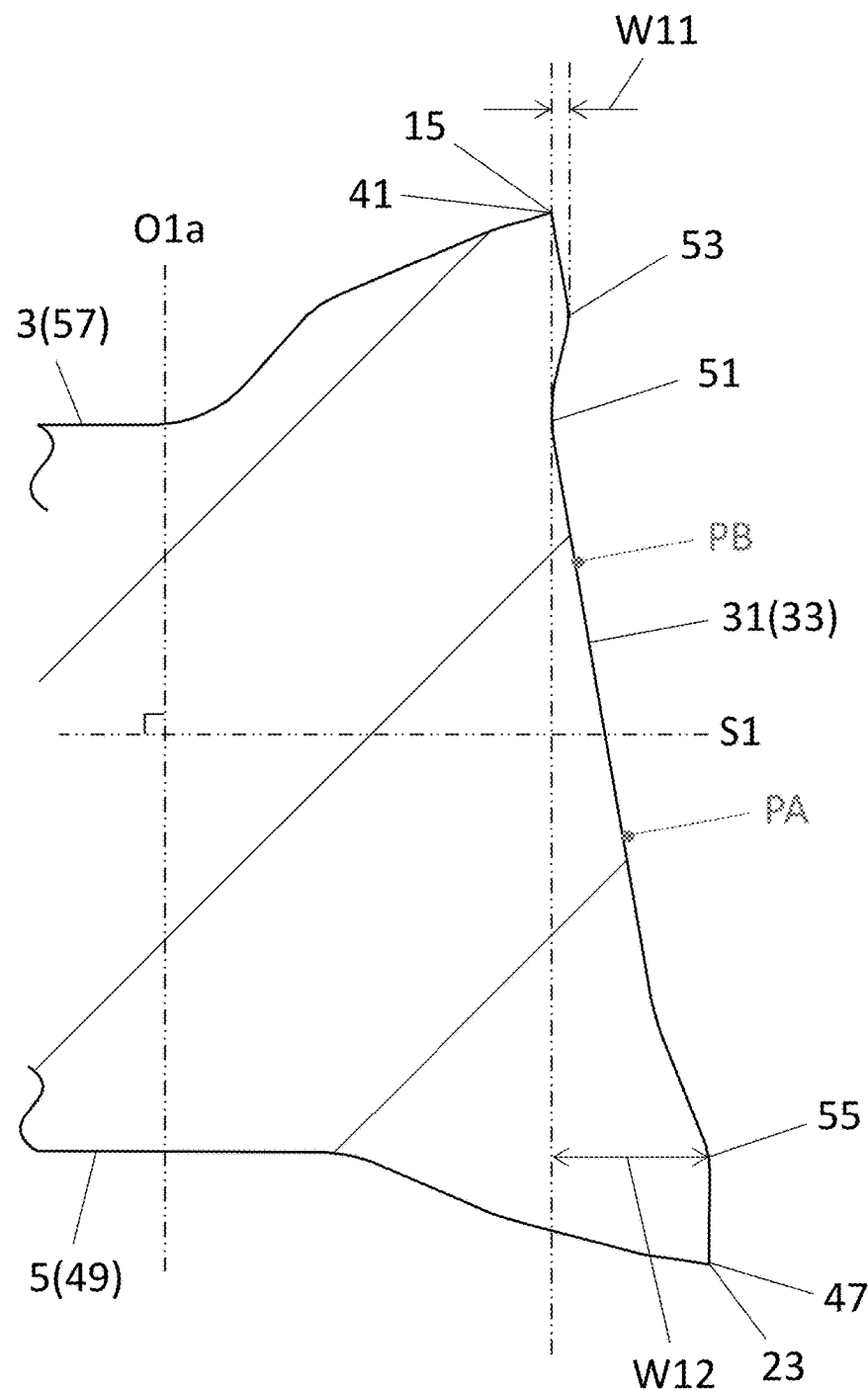
FIG. 11 is a sectional view taken along line XI-XI illustrated in FIG. 3.
Figure 12:
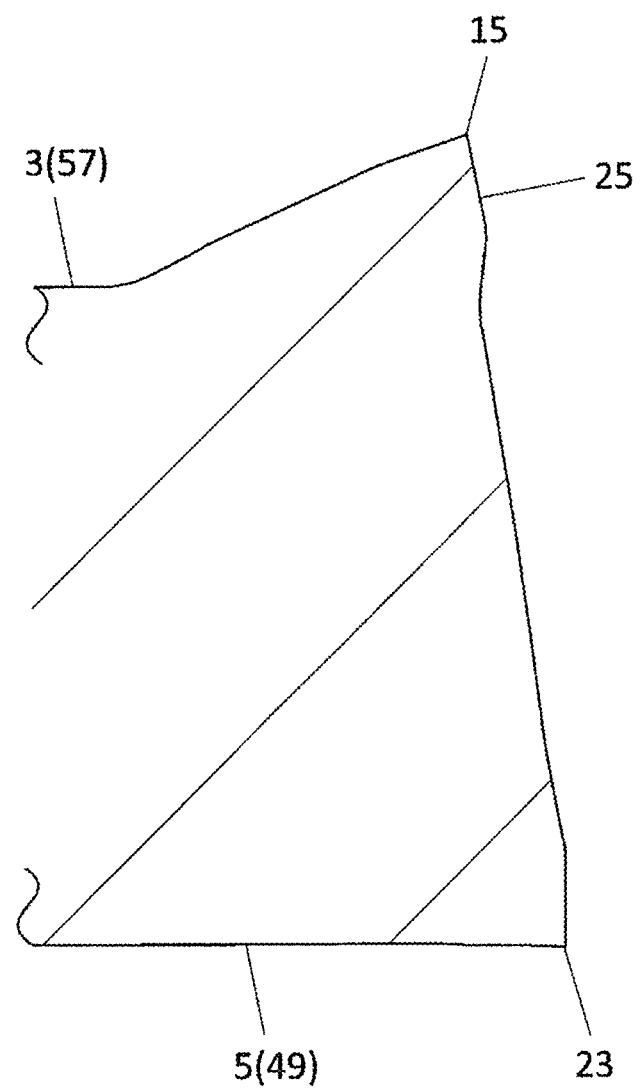
FIG. 12 is a sectional view taken along line XII-XII illustrated in FIG. 3.
Figure 13:
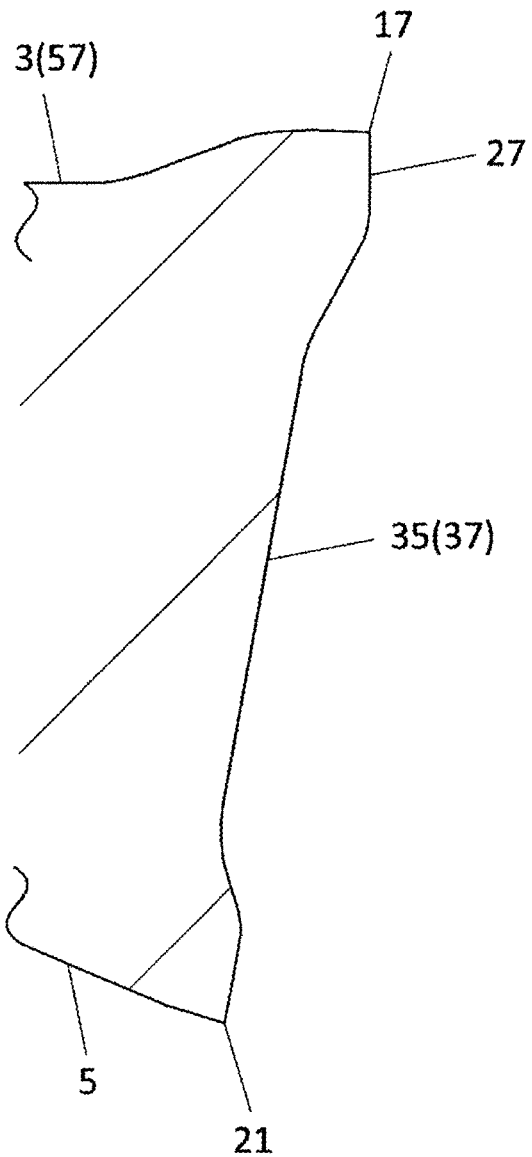
FIG. 13 is a sectional view taken along line XIII-XIII illustrated in FIG. 3.
Figure 14:
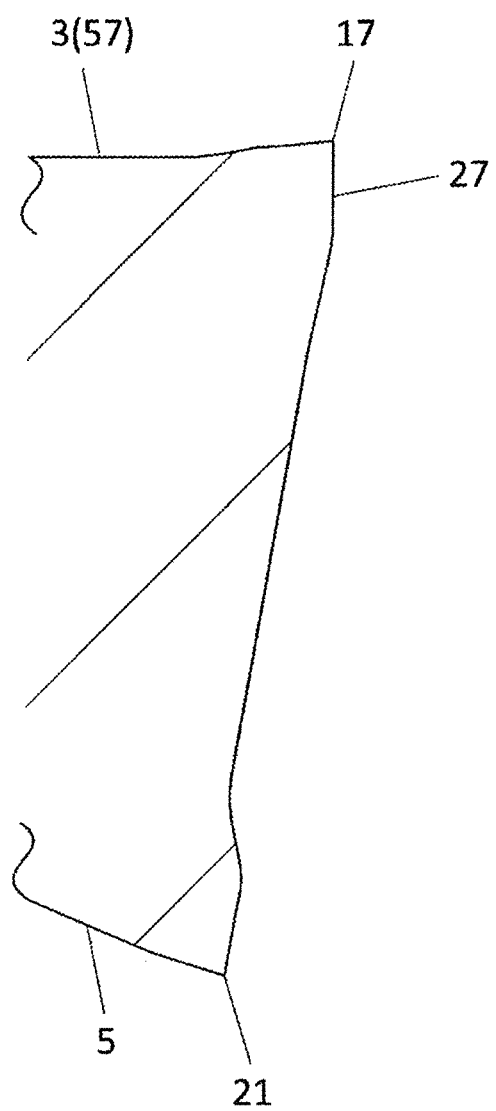
FIG. 14 is a sectional view taken along line XIV-XIV illustrated in FIG. 3.
Figure 15:
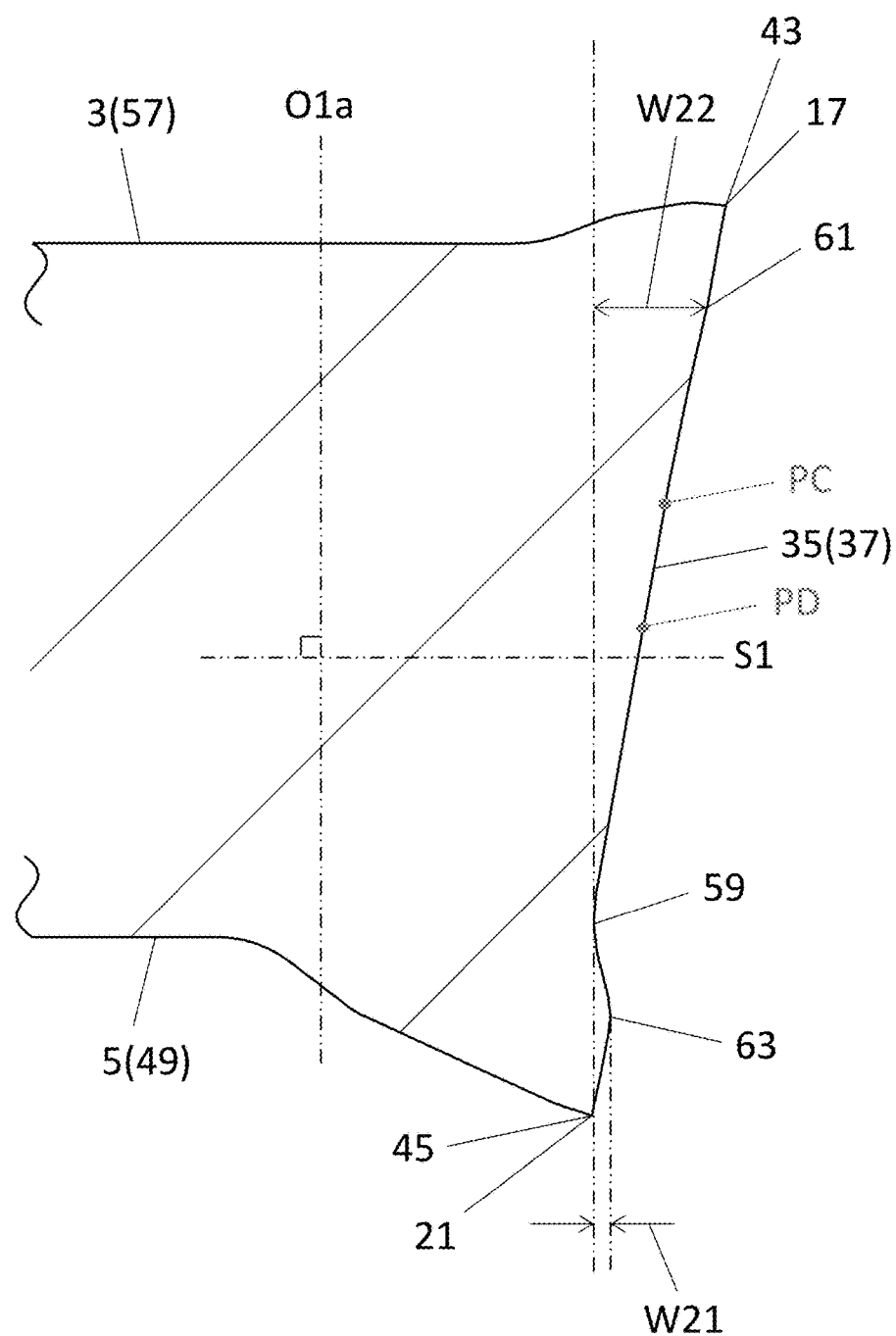
FIG. 15 is a sectional view taken along line XV-XV illustrated in FIG. 3.
Figure 16:
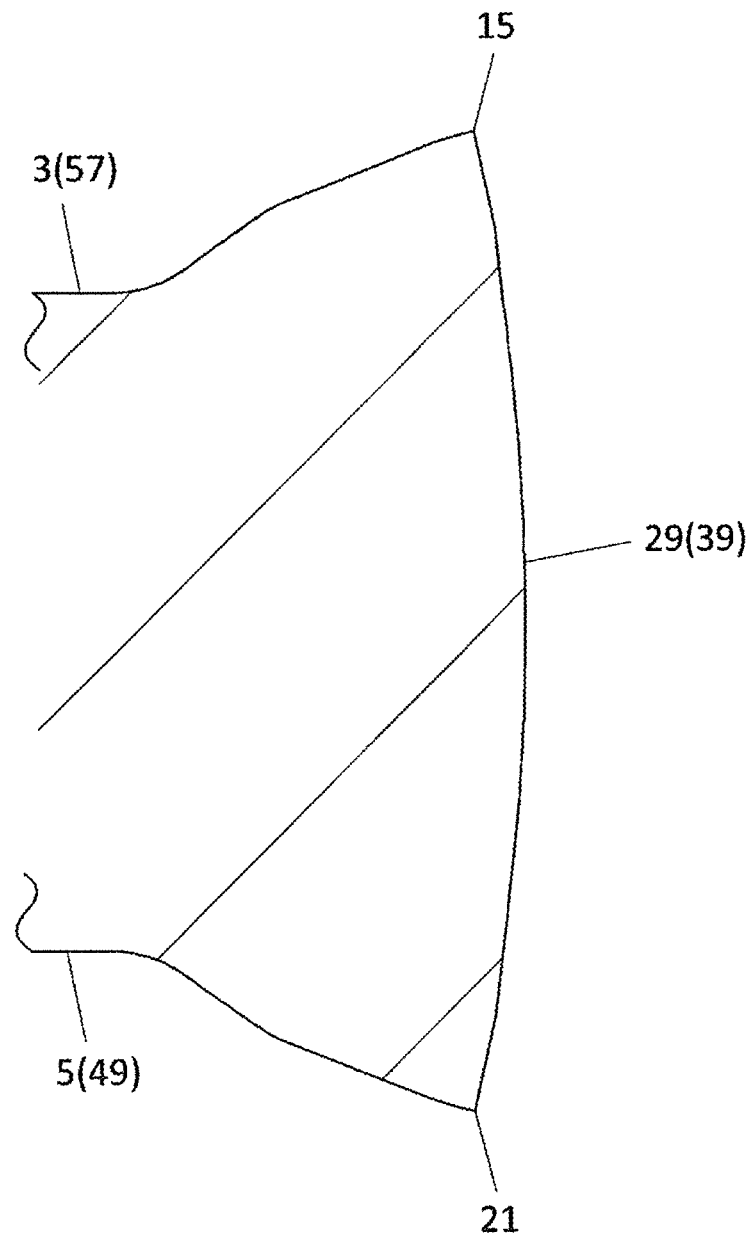
FIG. 16 is a sectional view taken along line XVI-XVI illustrated in FIG. 3.

As in a non-limiting embodiment illustrated in FIGS. 11 and 15, an imaginary plane that is orthogonal to the central axis O1 and is located halfway between the upper surface 3 and the lower surface 5 may be a reference plane S1. A positional relationship with the central axis O1 may be evaluated on the basis of an imaginary straight line O1a parallel to the central axis O1.

The first constraining surface 33 and the second constraining surface 37 may individually intersect with the reference plane S1. In this case, it is easy to avoid that the first constraining surface 33 and the second constraining surface 37 are located toward the upper surface 3 or the lower surface 5, and the insert 1 has enhanced constraining stability.

Figure 2:
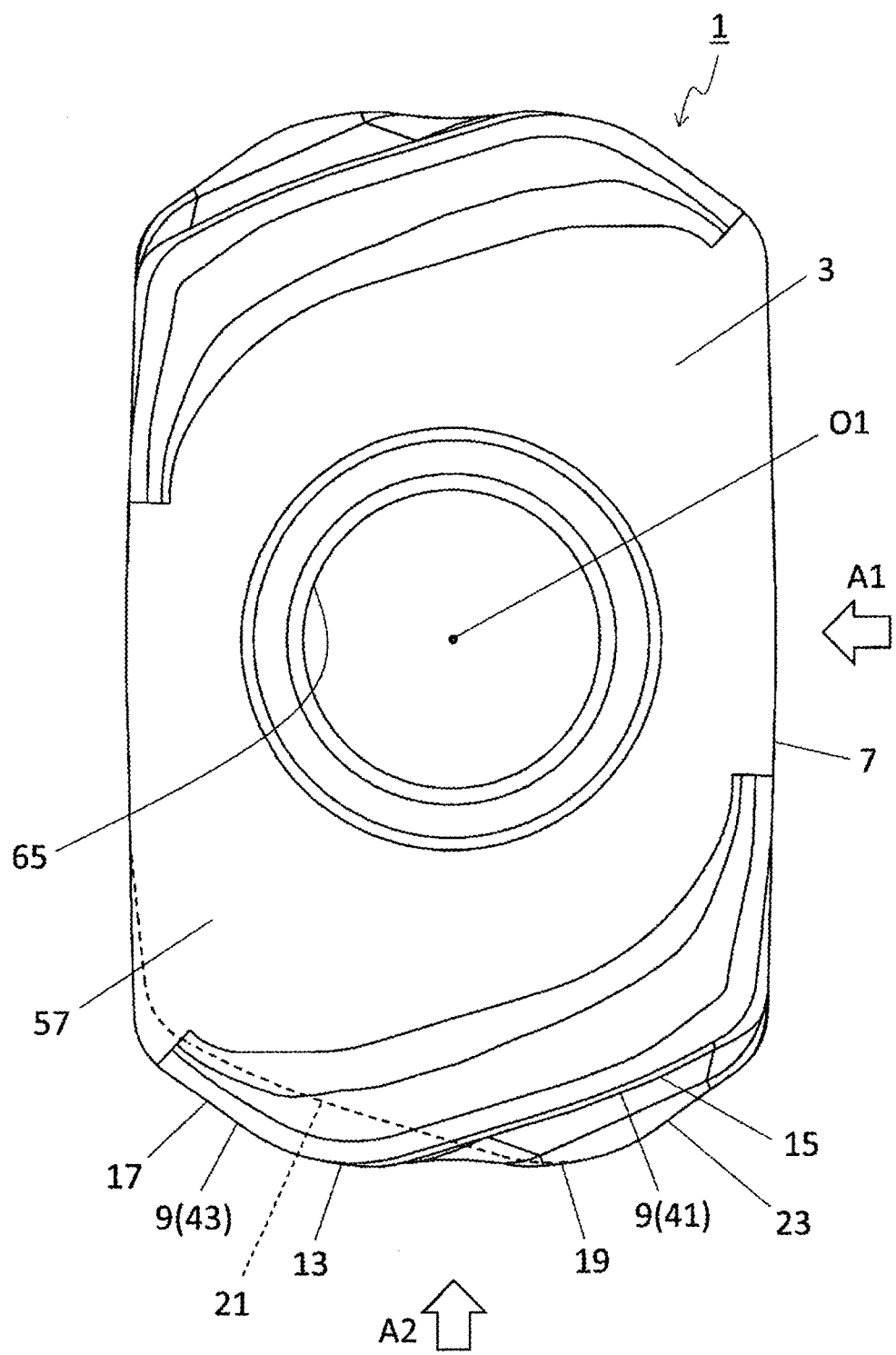
FIG. 2 is a plan view of the cutting insert illustrated in FIG. 1 as viewed from above.
Figure 3:
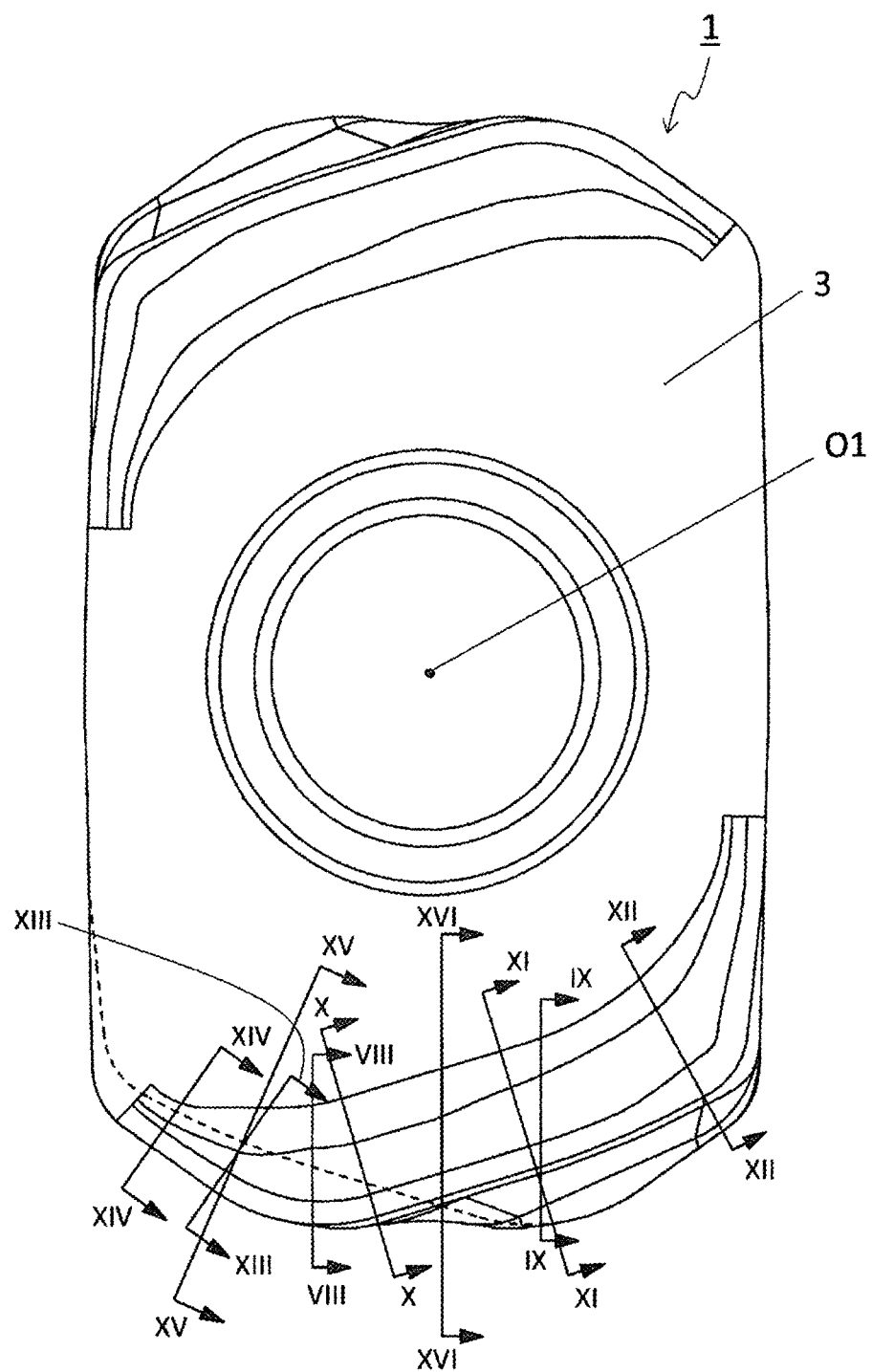
FIG. 3 is a plan view of the cutting insert illustrated in FIG. 1 as viewed from above.

The upper cutting edge 9 may have an upper major cutting edge 41 and an upper minor cutting edge 43 as in the non-limiting embodiment illustrated in FIG. 2. The upper major cutting edge 41 may be located on the first upper side 15. The upper minor cutting edge 43 may be located on the second upper side 17. The upper major cutting edge 41 is usable as a so-called major cutting edge that mainly machines a workpiece when a machined product is manufactured using the upper cutting edge 9. The upper minor cutting edge 43 is usable as an oblique ramping cutting edge when an oblique ramping process is carried out using the upper cutting edge 9. The upper minor cutting edge 43 is also usable as a so-called flat cutting edge that improves accuracy of a finished surface of the workpiece.

The first constraining surface 33 may be located more away from the central axis O1 as coming closer to the second lower side 23 as in a non-limiting embodiment illustrated in FIG. 11. Specifically, a first point PA at the first constraining surface 33 is located more away from the central axis O1 than a second point PB at the first constraining surface 33, the first point PA closer to the second lower side 23 than the second point PB in FIG. 11. The major cutting edge may be subjected to a relatively larger cutting load than the minor cutting edge. If the first constraining surface 33 is located more away from the central axis O1 as coming closer to the second lower side 23, it is easy to maintain a thickness of the insert 1 immediately below the upper major cutting edge 41 servable as the major cutting edge. This leads to enhanced durability of the insert 1.

A length of the upper major cutting edge 41 may be larger than a length of the upper minor cutting edge 43. The upper major cutting edge 41 may be located on the whole or a part of the first upper side 15. The upper minor cutting edge 43 may be located on the whole or a part of the second upper side 17. These points are also true for a lower major cutting edge 45 and a lower minor cutting edge 47 described later.

Figure 4:
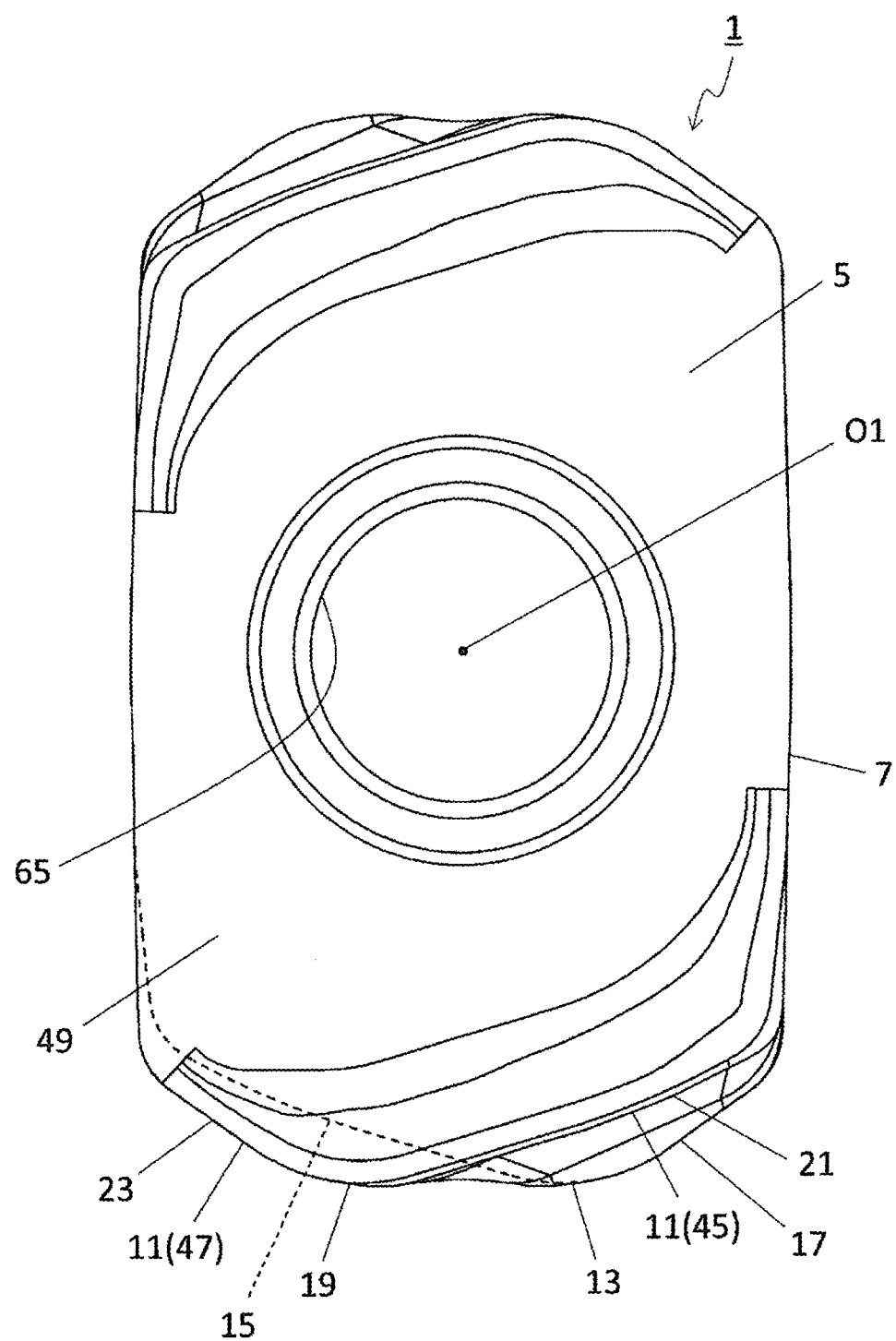
FIG. 4 is a plan view of the cutting insert illustrated in FIG. 1 as viewed from below.
Figure 5:
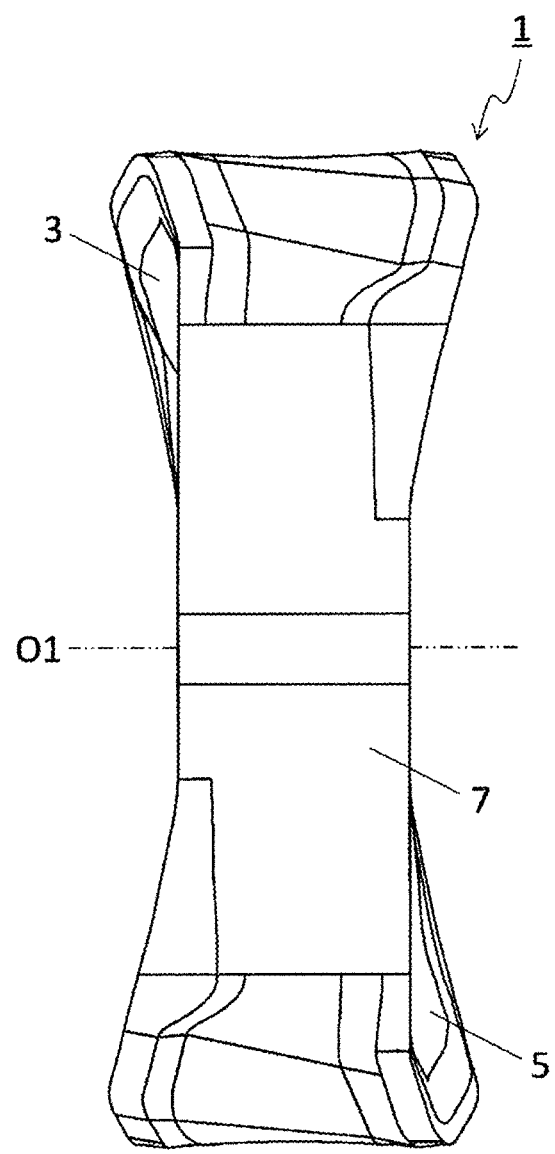
FIG. 5 is a side view of the cutting insert illustrated in FIG. 2 as viewed from an A1 direction.

The lower cutting edge 11 may have the lower major cutting edge 45 and the lower minor cutting edge 47 as in a non-limiting embodiment illustrated in FIG. 4. The lower major cutting edge 45 may be located on the first lower side 21. The lower minor cutting edge 47 may be located on the second lower side 23. The lower major cutting edge 45 is usable as a so-called major cutting edge that mainly machines a workpiece when a machined product is manufactured using the lower cutting edge 11. The lower minor cutting edge 47 is usable as an oblique ramping cutting edge when an oblique ramping process is carried out using the lower cutting edge 11. The lower minor cutting edge 47 is also usable as a so-called flat cutting edge that improves accuracy of a finished surface of the workpiece.

The second constraining surface 37 may be located more away from the central axis O1 as coming closer to the second upper side 17 as in a non-limiting embodiment illustrated in FIG. 15. Specifically, a third point PC at the second constraining surface 37 is located more away from the central axis O1 than a fourth point PD at the second constraining surface 37, the third point PC closer to the second upper side 17 than the fourth point PD in FIG. 15. In this case, it is easy to maintain a thickness of the insert 1 immediately above (immediately below) the lower major cutting edge 45 servable as the major cutting edge. This leads to enhanced durability of the insert 1.

In cases where the first constraining surface 33 is located more away from the central axis O1 as coming closer to the second lower side 23, and the second constraining surface 37 is located more away from the central axis O1 as coming closer to the second upper side 17, the minor cutting edge (the upper minor cutting edge 43 and the lower minor cutting edge 47) has enhanced versatility. That is, if the minor cutting edge is used as a flat cutting edge, the minor cutting edge can be easily made in a sharp shape, and therefore a machined surface has enhanced surface accuracy (has small surface roughness). If used in an oblique ramping process, the constraining surface immediately below (immediately above) the minor cutting edge is less likely to come into contact with a workpiece.

The lower surface 5 may have a lower seating surface 49 having a flat shape as in the non-limiting embodiment illustrated in FIG. 4. If a machined product is manufactured using the upper cutting edge 9, the lower seating surface 49 is abuttable (contactable) with a holder when attaching the insert 1 to the holder. The lower seating surface 49 may be perpendicular to the central axis O1. As used herein, the term "perpendicular" is not limited to being strictly perpendicular, but may mean permitting a range of approximately 90°±5°.

The second lower side 23 may be located more away from the central axis O1 than the first upper side 15 as viewed from above, as in the non-limiting embodiment illustrated in FIG. 2. In this case, it is easy to extend the lower seating surface 49 so as to reach near a position immediately below the first upper side 15 (the upper major cutting edge 41). Therefore, a cutting force applied to the first upper side 15 during a cutting process using the upper cutting edge 9 tends to be stably received by the lower seating surface 49.

The first concave part 31 may have a first bottom part 51, a first upper opening 53 and a first lower opening 55 as in a non-limiting embodiment illustrated in FIG. 11. The first upper opening 53 may be located on a side of the upper surface 3. The first lower opening 55 may be located on a side of the lower surface 5. The first bottom part 51 may be located closest to the central axis on the first concave part 31.

A width W11 from the first bottom part 51 to the first upper opening 53 in a direction along the reference plane S1 may be smaller than a width W12 from the first bottom part 51 to the first lower opening 55 in the direction along the reference plane S1 in a cross section orthogonal to the first upper side 15 as viewed from above. A comparison between the upper major cutting edge 41 and the lower minor cutting edge 47 respectively located above and below the first concave part 31 shows that a relatively large cutting load tends to be applied to the upper major cutting edge 41. If the width W11 is smaller than the width W12, it is easy to maintain a thickness of the insert 1 immediately below the upper major cutting edge 41. This leads to enhanced durability of the upper cutting edge 9.

The upper surface 3 may have an upper seating surface 57 having a flat shape as in the non-limiting embodiment illustrated in FIG. 2. If a machined product is manufactured using the lower cutting edge 11, the upper seating surface 57 is abuttable (contactable) with the holder when attaching the insert 1 to the holder. The upper seating surface 57 may be perpendicular to the central axis O1.

The second upper side 17 may be located more away from the central axis O1 than the first lower side 21 as viewed from below as in the non-limiting embodiment illustrated in FIG. 4. In this case, it is easy to extend the upper seating surface 57 so as to reach near a position immediately above (immediately below) the first lower side 21 (the lower major cutting edge 45). Therefore, a cutting force applied to the first lower side 21 during a cutting process using the lower cutting edge 11 tends to be stably received by the upper seating surface 57.

The second concave part 35 may have a second bottom part 59, a second upper opening 61 and a second lower opening 63 as in a non-limiting embodiment illustrated in FIG. 15. The second upper opening 61 may be located on a side of the upper surface 3. The second lower opening 63 may be located on a side of the lower surface 5. The second bottom part 59 may be located closest to the central axis O1 on the second concave part 35.

A width W21 from the second bottom part 59 to the second lower opening 63 in the direction along the reference plane S1 may be smaller than a width W22 from the second bottom part 59 to the second upper opening 61 in the direction along the reference plane S1 in a cross section orthogonal to the first lower side 21 as viewed from below. A comparison between the lower major cutting edge 45 and the upper minor cutting edge 43 respectively located above and below the second concave part 35 shows that a relatively large cutting load tends to be applied to the lower major cutting edge 45. If the width W21 is smaller than the width W22, it is easy to maintain a thickness of the insert 1 immediately above (immediately below) the lower major cutting edge 45. This leads to enhanced durability of the lower cutting edge 11.

The insert 1 may have a through hole 65. The through hole 65 is usable for inserting, for example, a screw when fixing the insert 1 to a holder. Instead of the screw, for example, a clamping member may be used to fix the insert 1 to the holder.

The through hole 65 may open into regions located on sides opposite to each other in the lateral surface 7, or may open into the upper surface 3 and the lower surface 5. The through hole 65 may open into the center of the upper surface 3 and the center of the lower surface 5 as in the non-limiting embodiment illustrated in FIG. 1. A central axis of the through hole 65 may be an imaginary straight line passing through the center of the upper surface 3 and the center of the lower surface 5. In other words, the central axis of the through hole 65 may coincide with the central axis O1 of the insert 1.

For example, cemented carbide and cermet are usable as a material of the insert 1. Examples of composition of the cemented carbide may include WC-Co, WC-TiC-Co and WC-TiC-TaC-Co, in which WC, TiC and TaC may be hard particles and Co may be a binding phase.

The cermet may be a sintered composite material obtainable by compositing metal into a ceramic component. Examples of the cermet may include titanium compounds composed mainly of titanium carbide (TiC) or titanium nitride (TiN). Of course, it should be clear that the material of the insert 1 is not limited to the above compositions.

A surface of the insert 1 may be coated with a coating film by using chemical vapor deposition (CVD) method or physical vapor deposition (PVD) method. Examples of composition of the coating film may include titanium carbide (TiC), titanium nitride (TiN), titanium carbon nitride (TiCN) and alumina ($Al_2O_3$).

<Cutting Tools>

Figure 17:
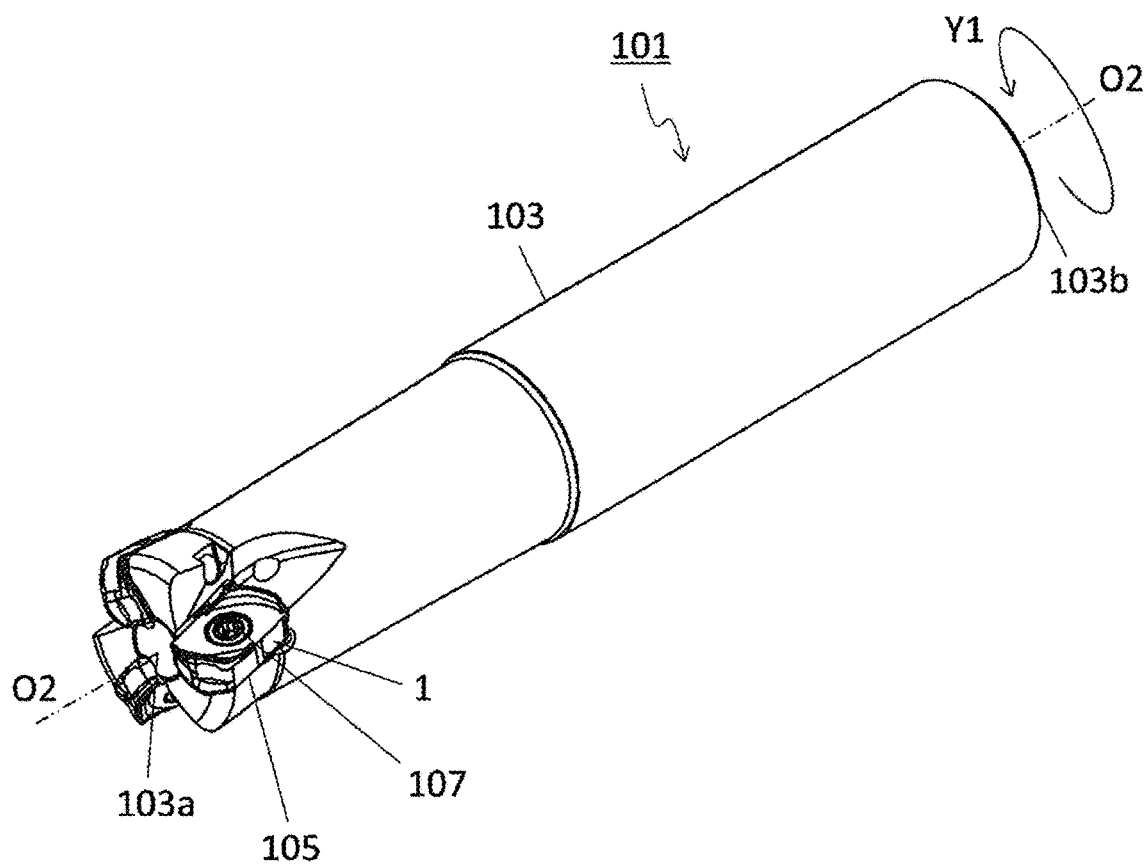
FIG. 17 is a perspective view illustrating a cutting tool in a non-limiting embodiment of the present disclosure.

A cutting tool 101 in a non-limiting embodiment of the present disclosure is described below with reference to FIGS. 17 and 18. In FIG. 17 and the like, a rotation axis O2 of the cutting tool 101 is indicated by a two-dot chain line, and a rotation direction of the rotation axis O2 is indicated by an arrow Y1.

Figure 18:
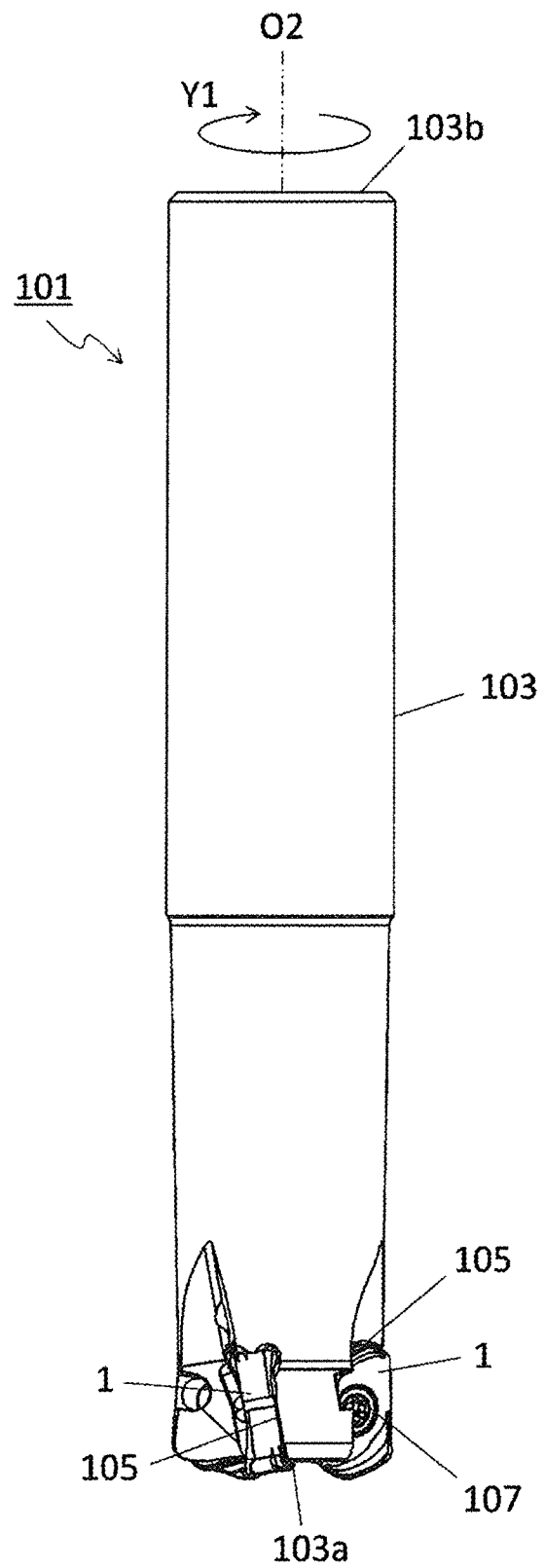
FIG. 18 is a side view of the cutting tool illustrated in FIG. 17.

The cutting tool 101 may have a holder 103 and an insert 1 as in the non-limiting embodiment illustrated in FIGS. 17 and 18. If the cutting tool 101 has the insert 1, excellent cutting performance is attainable because of the high constraining stability of the insert 1.

The cutting tool 101 is rotatable around the rotation axis O2. The cutting tool 101 may be used for a milling process.

The holder 103 may have a columnar shape extended along the rotation axis O2 from a first end 103a to a second end 103b. The columnar shape may be an approximately columnar shape, but need not be a strict columnar shape.

The holder 103 may have a pocket 105 located on a side of the first end 103a. The insert 1 is attachable to the pocket 105. The pocket 105 may open into an outer peripheral surface of the holder 103 and an end surface on a side of the first end 103a.

The insert 1 may be located in the pocket 105. There may be one or a plurality of pockets 105. If the holder 103 has the plurality of pockets 105, the cutting tool 101 may have a plurality of inserts 1, and the inserts 1 may be located one by one in the pockets 105.

In cases where the holder 103 has the plurality of pockets 105, these pockets 105 may be located around the rotation axis O2 at equal intervals or unequal intervals.

The insert 1 may be fitted to the pocket 105 so that at least a part of the cutting edge can protrude from the holder 103. For example, the insert 1 may be attached to the holder 103 so that the upper cutting edge 9 can protrude from the holder 103 toward a workpiece. In this case, the lower surface 5 and the lateral surface 7 may be in contact with the holder 103.

The insert 1 may be attached to the pocket 105 with a screw 107. Specifically, the insert 1 may be attached to the holder 103 by inserting the screw 107 into the through hole 65 of the insert 1, and by inserting a front end of the screw 107 into a screw hole formed in the pocket 105 so as to fix the screw 107 to the screw hole.

For example, steel and cast iron are usable as a material of the holder 103. If the material of the holder 103 is steel, the holder 103 has high toughness.

<Methods for Manufacturing Machined Product>

Methods for manufacturing a machined product 203 in non-limiting embodiments of the present disclosure are described below with reference to FIGS. 19 to 21.

The machined product 203 may be manufactured by carrying out a cutting process of a workpiece 201. The method for manufacturing the machined product 203 in the non-limiting embodiments may have the following steps:

(1) rotating the cutting tool 101 represented by the above non-limiting embodiment;
(2) bringing the cutting tool 101 being rotated into contact with the workpiece 201; and
(3) moving the cutting tool 101 away from the workpiece 201.

Figure 19:
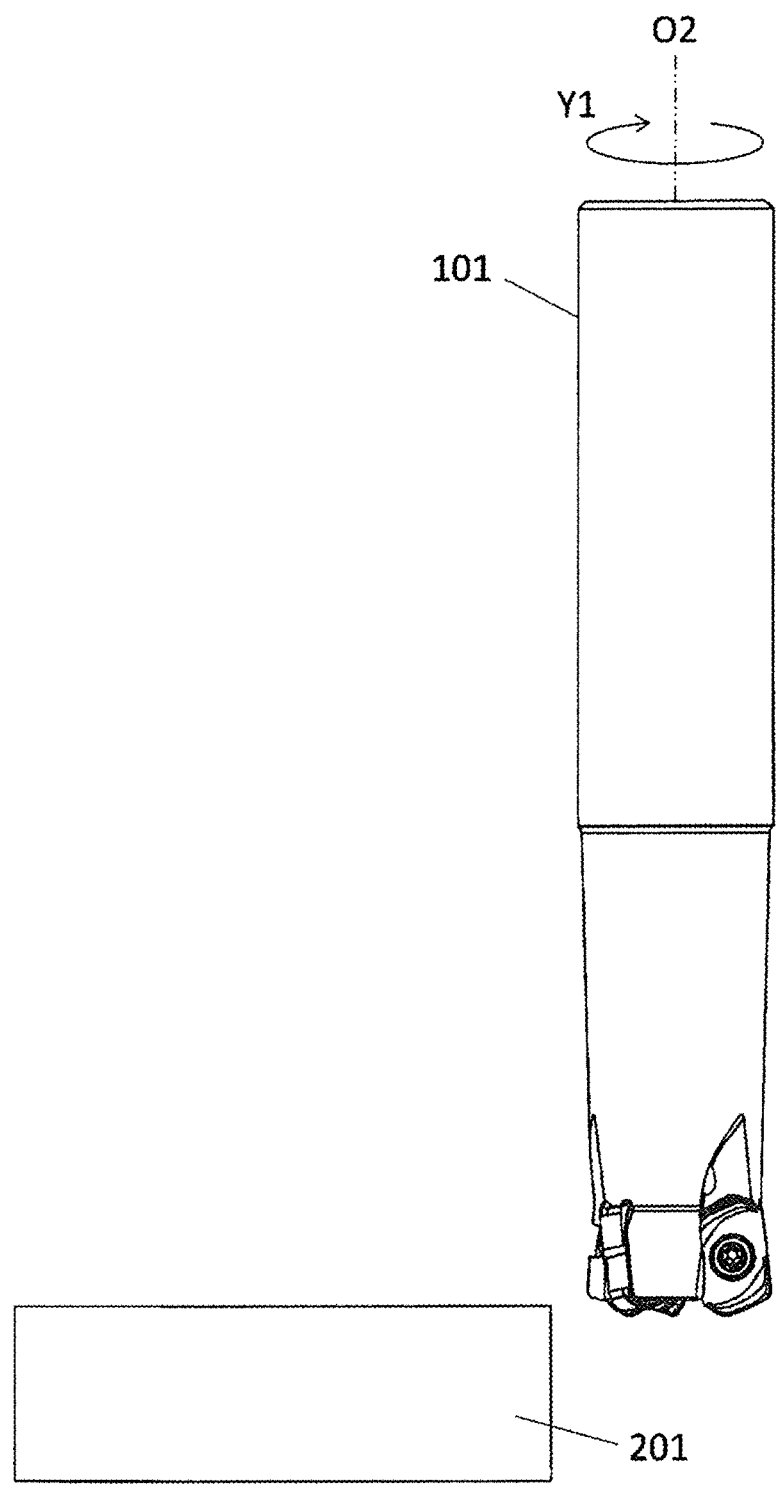
FIG. 19 is a schematic diagram illustrating one of steps in a method for manufacturing a machined product in a non-limiting embodiment of the present disclosure.

Specifically, firstly, the cutting tool 101 may be relatively brought near the workpiece 201 while rotating the cutting tool 101 around the rotation axis O2 in a Y1 direction as in the non-limiting embodiment illustrated in FIG. 19. Subsequently, the workpiece 201 may be cut out by bringing the upper cutting edge 9 of the cutting tool 101 into contact with the workpiece 201 as in a non-limiting embodiment illustrated in FIG. 20. Thereafter, the cutting tool 101 may be relatively moved away from the workpiece 201 as in a non-limiting embodiment illustrated in FIG. 21.

The insert 1 has high constraining stability if the steps described above are carried out. It is therefore possible to obtain the machined product 203 having a highly precise finished surface.

Figure 20:
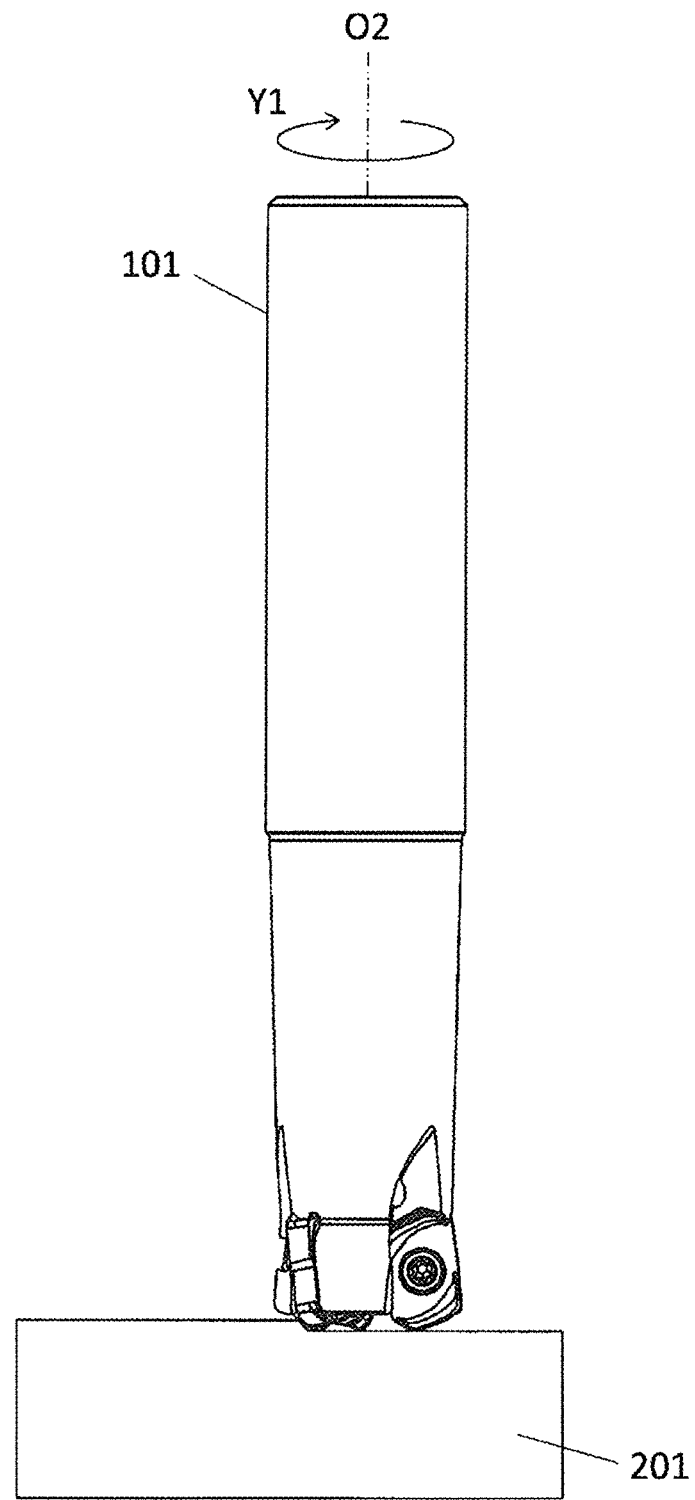
FIG. 20 is a schematic diagram illustrating one of the steps in the method for manufacturing a machined product in the non-limiting embodiment of the present disclosure.
Figure 21:
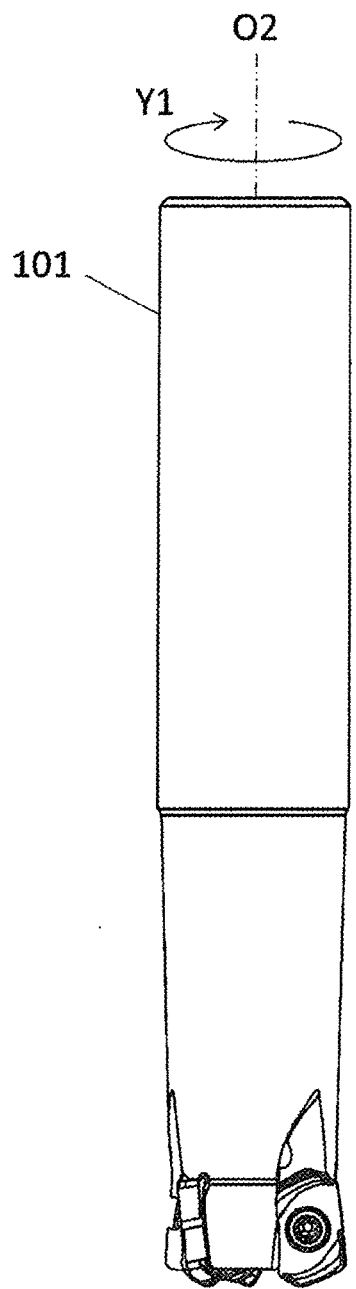
FIG. 21 is a schematic diagram illustrating one of the steps in the method for manufacturing a machined product in the non-limiting embodiment of the present disclosure.
Figure 21:

Although the workpiece 201 is fixed and the cutting tool 101 is moved in the individual steps in the non-limiting embodiment illustrated in FIGS. 19 to 21, of course, there is no intention to limit to this embodiment.

For example, the workpiece 201 may be brought near the cutting tool 101 in the step (1). Similarly, the workpiece 201 may be moved away from the cutting tool 101 in the step (3). If it is desired to continue the cutting process, the step of bringing the upper cutting edge 9 of the insert 1 into contact with different portions of the workpiece 201 may be repeated while keeping the cutting tool 101 rotated.

Examples of material of the workpiece 201 may include carbon steel, alloy steel, stainless steel, cast iron and non-ferrous metals.

The invention claimed is:

1. A cutting insert, comprising:
   an upper surface having a polygonal shape, the upper surface comprising
      a first upper corner,
      a first upper side extended from the first upper corner, and
      a second upper side extended from the first upper corner;
   a lower surface having a polygonal shape, the lower surface comprising
      a first lower corner located below the first upper corner,
      a first lower side located below the second upper side and extended from the first lower corner, and
      a second lower side located below the first upper side and extended from the first lower corner;
   a lateral surface located between the upper surface and the lower surface;
   an upper cutting edge located on an intersection of the upper surface and the lateral surface; and
   a lower cutting edge located on an intersection of the lower surface and the lateral surface,
   wherein
   the lateral surface comprises
      a first lateral surface connecting to the first upper side and the second lower side,
      a second lateral surface connecting to the second upper side and the first lower side, and
      a third lateral surface located between the first lateral surface and the second lateral surface,
   an imaginary straight line passing through a center of the upper surface and a center of the lower surface is a central axis,
   the first lateral surface comprises a first concave part comprising
      a first constraining surface having a flat shape, and
      a first inclined surface closer to the first upper side than the first constraining surface, the first inclined surface extending away from a first virtual straight line as the first inclined surface extending towards the first upper side, the first virtual straight line passing through the first upper side and parallel to the central axis,
   the second lateral surface comprises a second concave part comprising a second constraining surface having a flat shape,
   the third lateral surface comprises a convex part having a convex shape in a cross section along the central axis,
   the first concave part and the second concave part are separated from each other by the convex part,
   the first constraining surface is located halfway between the upper surface and the lower surface in a direction along the central axis, and
   in a cross section orthogonal to the first upper side,
      a first point at the first constraining surface is located closer to the first virtual straight line than a second point at the first constraining surface, the first point at the first constraining surface being located between the first upper side and the second point at the first constraining surface in the direction along the central axis,
      an end point of the first constraining surface on a side of the lower surface is located on an outer side of the first virtual straight line, and
      a first point at the first inclined surface is located further away from the first virtual straight line than a second point at the first inclined surface, the first point at the first inclined surface being located between the first upper side and the second point at the first inclined surface in the direction along the central axis.

2. The cutting insert according to claim 1, wherein
   an imaginary plane that is orthogonal to the central axis and is located halfway between the upper surface and the lower surface is a reference plane, and
   the first constraining surface and the second constraining surface individually intersect with the reference plane.

3. The cutting insert according to claim 1, wherein
   the upper cutting edge comprises
      an upper major cutting edge located on the first upper side, and
      an upper minor cutting edge located on the second upper side, and
   the second point at the first constraining surface is located further away from the central axis than the first point at the first constraining surface, the second point at the first constraining surface is between the second lower side and the first point at the first constraining surface in the direction along the central axis.

4. The cutting insert according to claim 1, wherein
   the lower cutting edge comprises
      a lower major cutting edge located on the first lower side, and
      a lower minor cutting edge located on the second lower side, and
   a third point at the second constraining surface is located further away from the central axis than a fourth point at the second constraining surface, the third point at the second constraining surface is between the second upper side and the fourth point at the second constraining surface in the direction along the central axis.

5. The cutting insert according to claim 1, wherein
   the lower surface comprises a lower seating surface having a flat shape, and
   the second lower side is located further away from the central axis than the first upper side in a radial direction perpendicular to the direction along the central axis.

6. The cutting insert according to claim 1, wherein
   the first concave part comprises
      a first bottom part,
      a first upper opening located on a side of the upper surface, and
      a first lower opening located on a side of the lower surface, and
   in a cross section orthogonal to the first upper side, a distance from the first bottom part to the first upper opening in a radial direction perpendicular to the direction along the central axis is smaller than a distance from the first bottom part to the first lower opening in the radial direction.

7. The cutting insert according to claim 1, wherein
the upper surface comprises an upper seating surface having a flat shape, and
the second upper side is located further away from the central axis than the first lower side in a radial direction perpendicular to the direction along the central axis.

8. The cutting insert according to claim 1, wherein
the second concave part comprises
   a second bottom part,
   a second upper opening located on a side of the upper surface, and
   a second lower opening located on a side of the lower surface, and
in a cross section orthogonal to the first lower side, a distance from the second bottom part to the second lower opening in a radial direction perpendicular to the direction along the central axis is smaller than a distance from the second bottom part to the second upper opening in the radial direction.

9. A cutting tool, comprising:
a holder having a columnar shape extended along a rotation axis from a first end to a second end, the holder comprising a pocket located on a side of the first end; and
the cutting insert according to claim 1, the cutting insert being located in the pocket.

10. A method for manufacturing a machined product, the method comprising:
rotating the cutting tool according to claim 9;
bringing the cutting tool being rotated into contact with a workpiece; and
moving the cutting tool away from the workpiece.

11. The cutting insert according to claim 1, wherein
the second concave part further comprises a second inclined surface closer to the first lower side than the second constraining surface, the second inclined surface extending away from a second virtual straight line as the second inclined surface extending towards the first lower side, the second virtual straight line passing through the first lower side and parallel to the central axis,
the second constraining surface is located halfway between the upper surface and the lower surface in the direction along the central axis, and
in a cross section orthogonal to the first lower side,
   a first point at the second constraining surface is located further away from a second virtual straight line than a second point at the second constraining surface, the first point at the second constraining surface being located between the second upper side and the second point at the second constraining surface in the direction along the central axis,
   an end point of the second constraining surface on a side of the upper surface is located on an outer side of the second virtual straight line, and
   a first point at the second inclined surface is located further away from the second virtual straight line than a second point at the second inclined surface, the second point at the second inclined surface being located between the second upper side and the first point at the second inclined surface in the direction along the central axis.

* * * * *